(12) United States Patent
Biseli

(10) Patent No.: US 7,967,336 B2
(45) Date of Patent: Jun. 28, 2011

(54) WHEELCHAIR TRANSPORT RACK FOR MOTORCYCLES AND RECREATIONAL VEHICLES

(76) Inventor: David A. Biseli, Belleair, FL (US)

( * ) Notice: Subject to any disclaimer, the term of this patent is extended or adjusted under 35 U.S.C. 154(b) by 235 days.

(21) Appl. No.: 12/489,542

(22) Filed: Jun. 23, 2009

(65) Prior Publication Data

US 2010/0320738 A1    Dec. 23, 2010

(51) Int. Cl.
B60R 9/06    (2006.01)

(52) U.S. Cl. ........ 280/769; 280/762; 242/519; 242/401; 242/413; 242/537; 18/219

(58) Field of Classification Search .................. 242/519, 242/401, 413, 522–523, 532–534, 537; 280/762, 280/769; 18/219
See application file for complete search history.

(56) References Cited

U.S. PATENT DOCUMENTS

| | | | | |
|---|---|---|---|---|
| 4,297,069 A | * | 10/1981 | Worthington | 414/462 |
| 4,411,580 A | * | 10/1983 | Kelly | 414/462 |
| 4,437,599 A | * | 3/1984 | Jordening | 224/319 |
| 4,438,875 A | * | 3/1984 | Fritsch | 224/533 |
| 4,565,482 A | * | 1/1986 | Baker | 414/462 |
| 4,573,854 A | * | 3/1986 | McFarland | 414/462 |
| 4,697,975 A | * | 10/1987 | Lippold | 414/462 |
| 4,738,581 A | * | 4/1988 | Kuhlman | 414/462 |
| 4,775,282 A | * | 10/1988 | Van Vliet | 414/462 |
| 4,961,477 A | * | 10/1990 | Sweeney | 180/219 |
| 5,199,842 A | * | 4/1993 | Watt et al. | 414/537 |
| 5,482,424 A | * | 1/1996 | Jones et al. | 414/462 |
| 5,536,130 A | * | 7/1996 | Edensor | 414/462 |
| 6,595,398 B2 | * | 7/2003 | Himel, Jr. | 224/495 |
| 7,661,693 B1 | * | 2/2010 | Lipski | 280/491.5 |
| 2007/0189885 A1 | * | 8/2007 | Madormo et al. | 414/467 |
| 2008/0206030 A1 | * | 8/2008 | Reuille et al. | 414/462 |

* cited by examiner

Primary Examiner — J. Allen Shriver, II
Assistant Examiner — James Triggs
(74) Attorney, Agent, or Firm — Dennis G. LaPointe

(57) ABSTRACT

A transporting device for transporting a wheelchair directly on a motorcycle or recreational vehicle, the device being configured to include a frame attachment portion for attaching the bracket to a frame portion of a motorcycle or recreational vehicle, a spaced-apart portion configured to receive and secure a portion of a foot rest of a wheelchair, and a spaced-apart wheelchair axle receiving and securement portion located at a level above the frame attachment portion and the portion for receiving and securing a portion of the foot rest.

9 Claims, 7 Drawing Sheets

WHEELCHAIR TRANSPORT RACK FOR MOTORCYCLES AND RECREATIONAL VEHICLES

FIELD OF THE INVENTION

The invention relates to a wheelchair specific mounting device, which would be used to transport the user's wheelchair and accessories, while riding a motorcycle and/or recreational vehicle, including all terrain vehicles. The purpose of the device is to transport a wheelchair and all its parts and accessories that the user may need.

BACKGROUND OF THE INVENTION

The object of the invention is to provide a wheelchair bound individual the mobility and freedom to ride a motorcycle and/or recreational vehicle by providing a means for the rider to transport his or her wheelchair directly on the vehicle. Prior to this time it has been difficult, if not impossible, to safely enjoy the freedom of movement provided by this device. Most wheelchairs are transported on small trailers attached to the back of the motorcycle frame. The swiveling of trailers or bouncing action of light weight trailers can cause safety problems for the rider.

SUMMARY OF THE INVENTION

The invention is a wheelchair transporting device that attaches to a motorcycle or recreational vehicle. For purposes of this application, the use of the term motorcycle or recreational vehicle will be considered synonymous. Included are 2-wheel motorcycles and multiple wheel motorcycles and recreational all terrain vehicles.

The device can be easily attached and removed to the frame of the motorcycle and/or recreational vehicle using bolts and/or clamps. The means of attaching the device would be determined by the make and/or model of the motorcycle and/or recreational vehicle. Further, the size or adjustability of the device would be determined by the make and/or model of the wheelchair, however, the device can be made or configured to universally adapt to many model motorcycles or recreational vehicles.

In addition, the device would take into consideration the dimensions, style (rigid or folding type wheelchairs) and the individual's capabilities. Generally, the invention is a transporting device for transporting a wheelchair directly on a motorcycle or recreational vehicle, the device being configured to include a frame attachment portion for attaching the bracket to a frame portion of a motorcycle or recreational vehicle, a spaced-apart portion configured to receive and secure a portion of a foot rest of a wheelchair, and a spaced-apart wheelchair axle receiving and securement portion located at a level above the frame attachment portion and the portion for receiving and securing a portion of the foot rest.

DETAILED DESCRIPTION OF THE INVENTION

Figure 1:
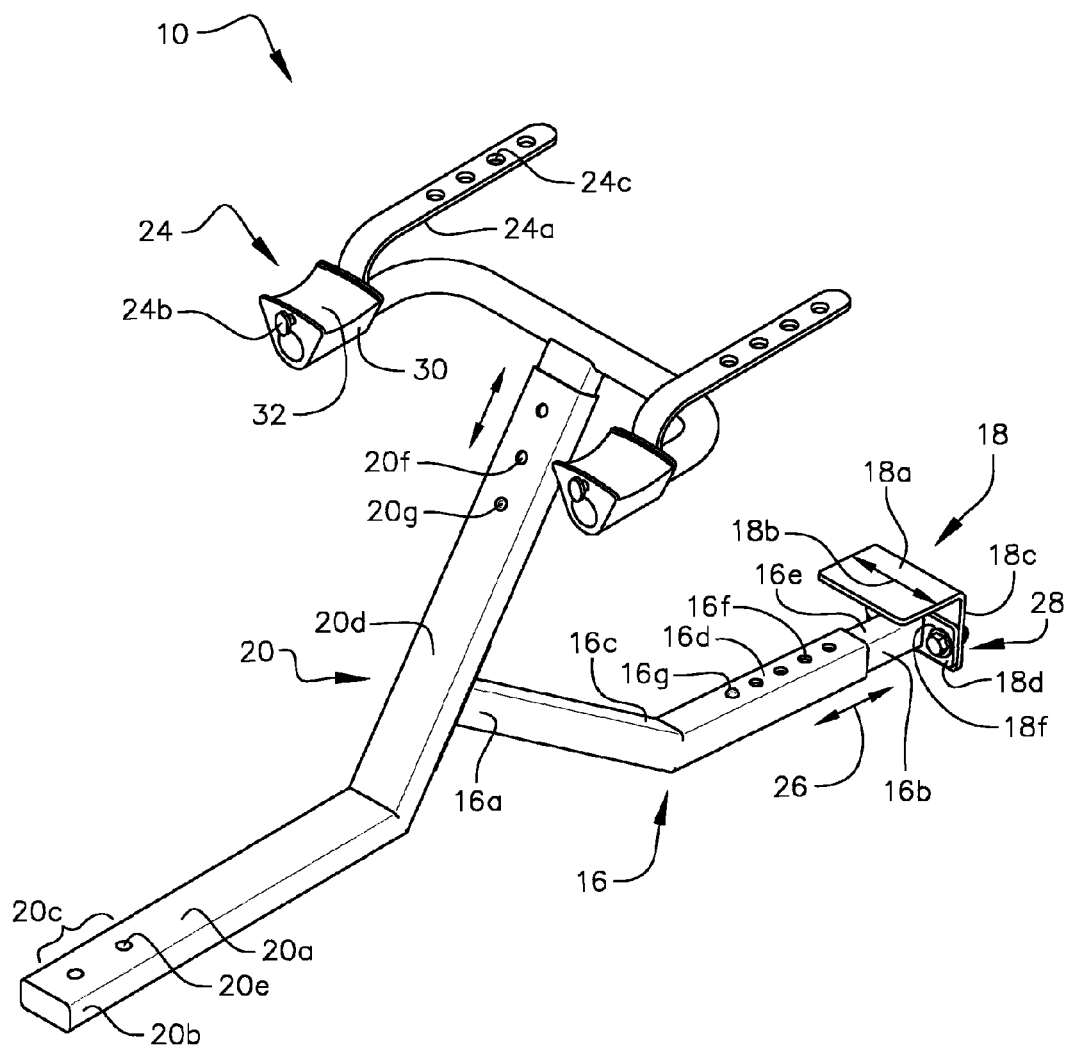
FIG. 1 is a perspective view of one embodiment of the invention.
Figure 2:
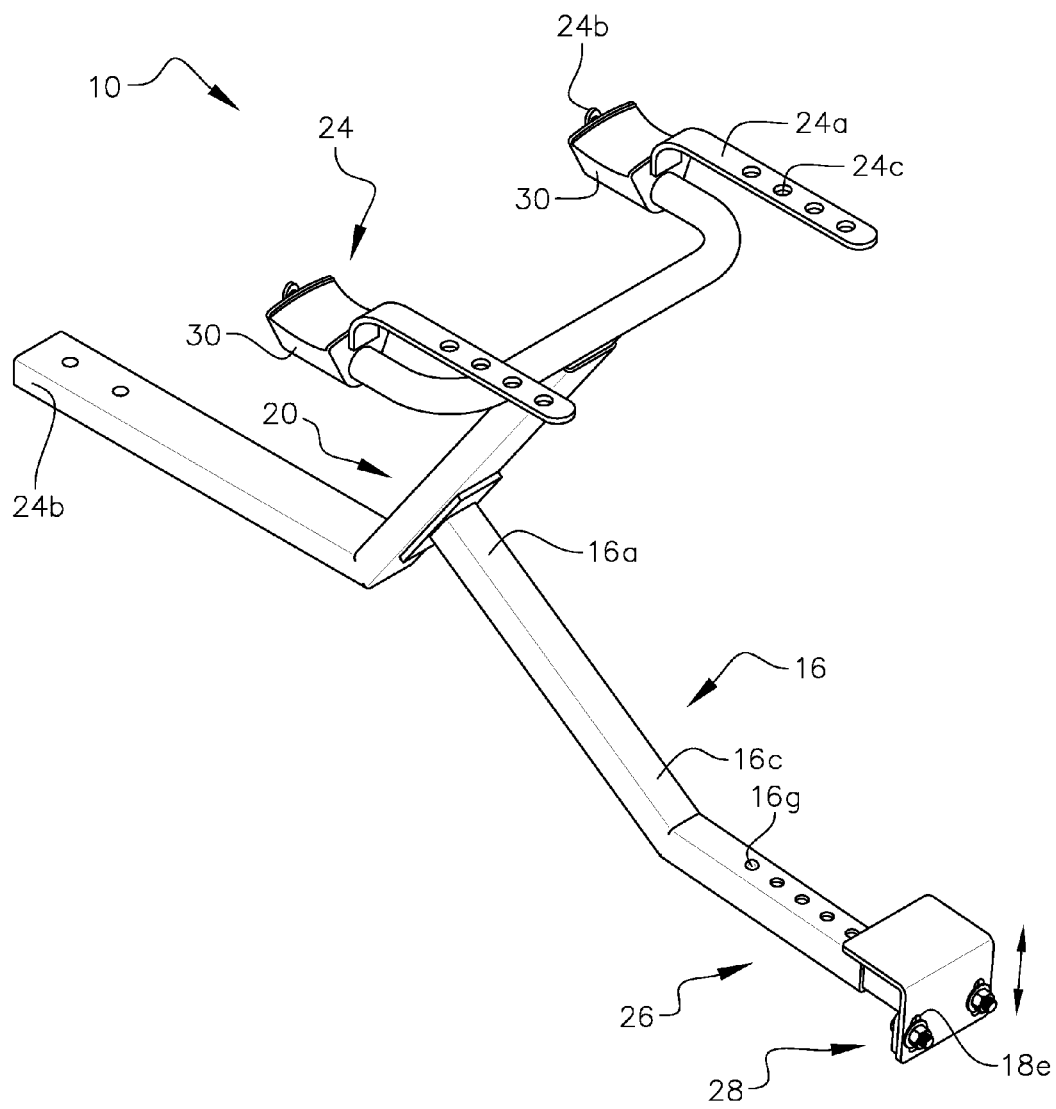
FIG. 2 is a perspective view of the invention of FIG. 1 taken from a different angle.

Referring now to the drawings, FIGS. 1-7 conceptually disclose the present invention, which is a transporting device for transporting a wheelchair directly on a motorcycle or recreational vehicle, depicted generally as 10.

The transporting device 10 for transporting a wheelchair directly on a motorcycle or recreational vehicle 14 includes a first elongate structural member 16 having a proximal end 16a and a distal end 16b. The distal end 16b has means 18 for receiving and securing a foot rest of a wheelchair 12, which includes a portion of a rigid foot rest 12a of a wheelchair 12 or portions of separated adjacent foot rests 12b,12b' of a wheelchair 12.

The proximal end 16a of the first elongate structural member 16 is attached to an intermediate location on a second elongate structural member 20. A lower portion of the second elongate structural member 20 has a bent portion 20a configured to facilitate attachment to a frame portion 22 of the motorcycle or recreational vehicle 14. A distal portion 20b of the bent portion 20a of the second elongate structural member 20 has frame attachment means 20c for attaching the device 10 to the frame portion 22 of the motorcycle or recreational vehicle 14.

The second elongate structural member 20 includes a generally upward directed portion 20d, where its upper end further includes means 24 for receiving and securing an axle 12c of the wheelchair 12.

Figure 3:
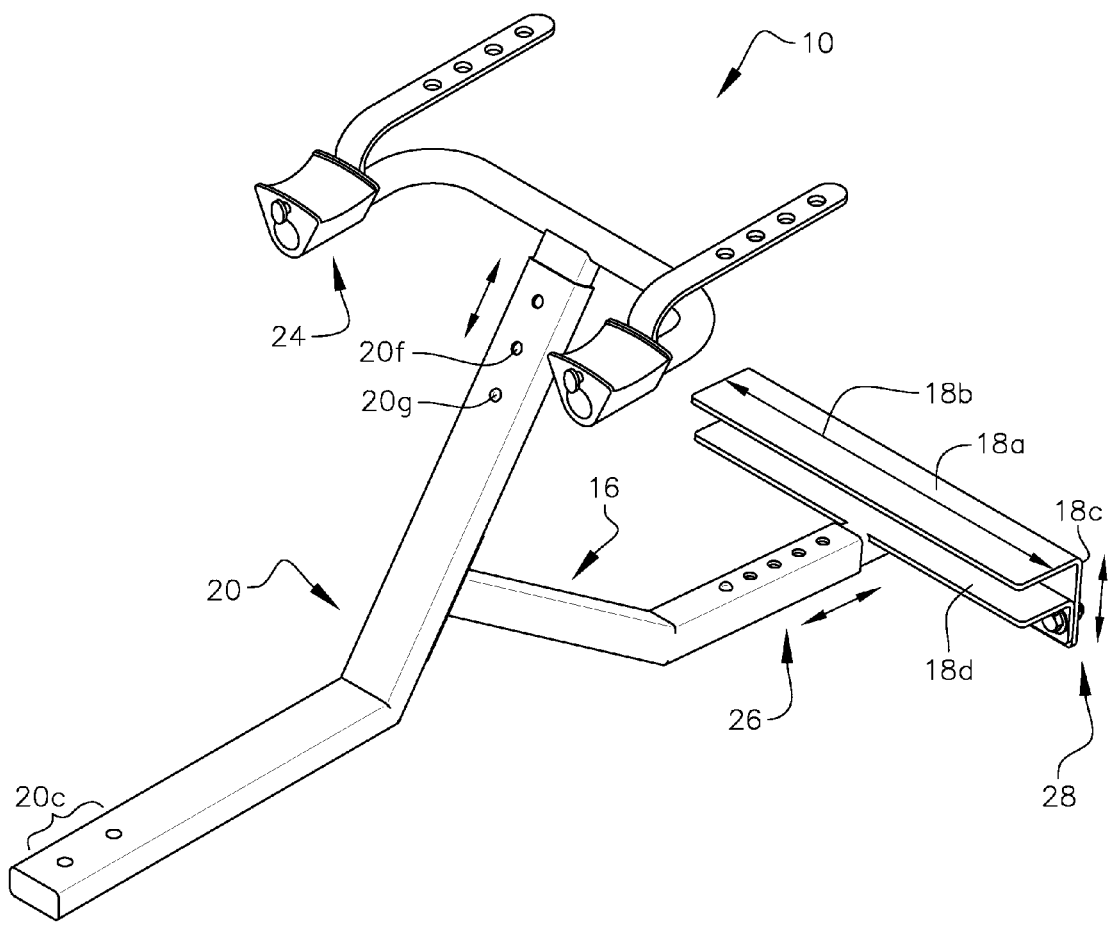
FIG. 3 is a perspective view of another embodiment of the invention similar to that of FIG. 1, with the wheelchair foot rest securement portion configured to be sufficiently wide to accept a split non-rigid foot rest.
Figure 4:
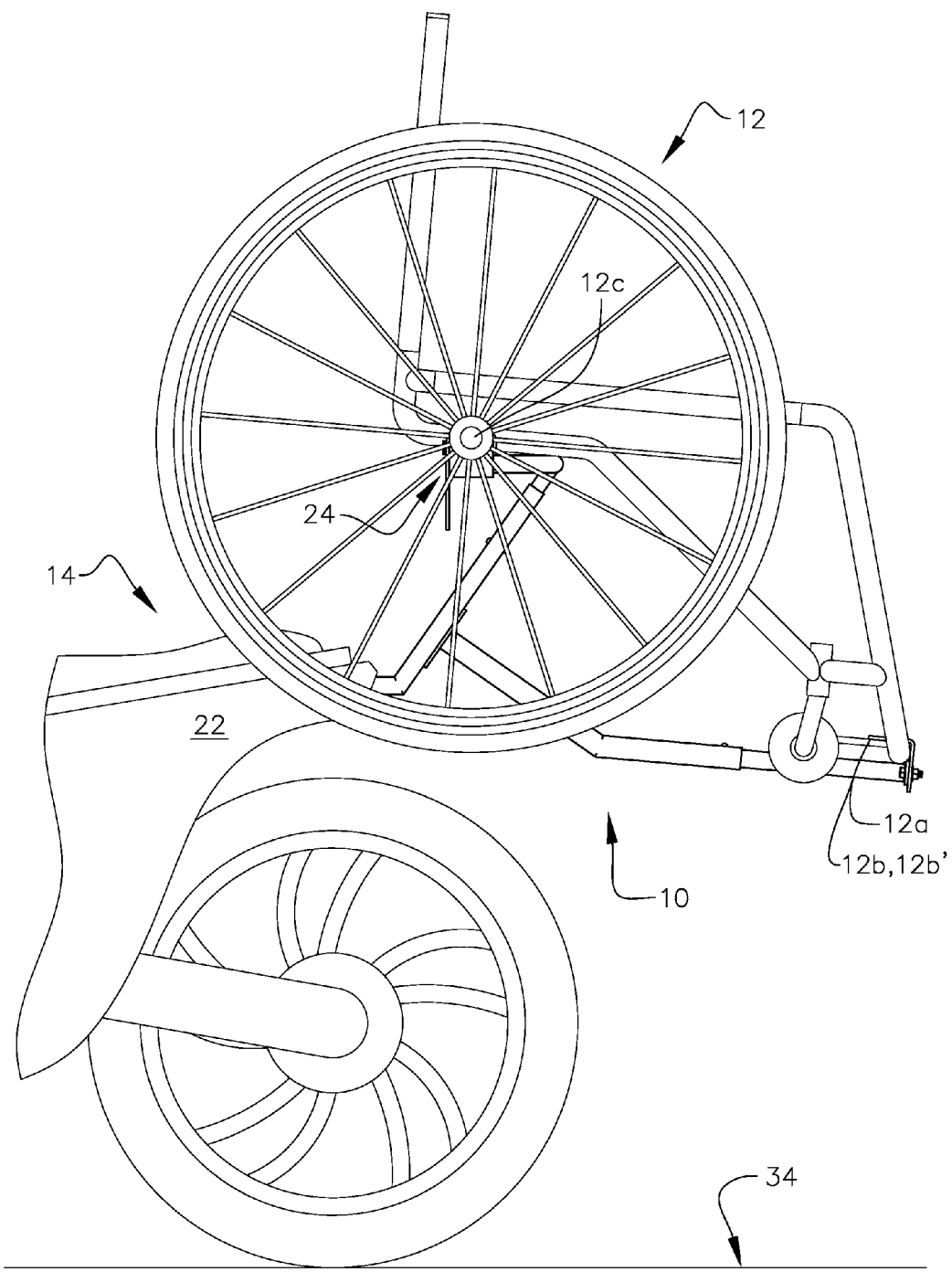
FIG. 4 is a representative side view of the invention mounted to the back side frame of a motorcycle or recreational vehicle with a wheelchair mounted to the invention.
Figure 5:
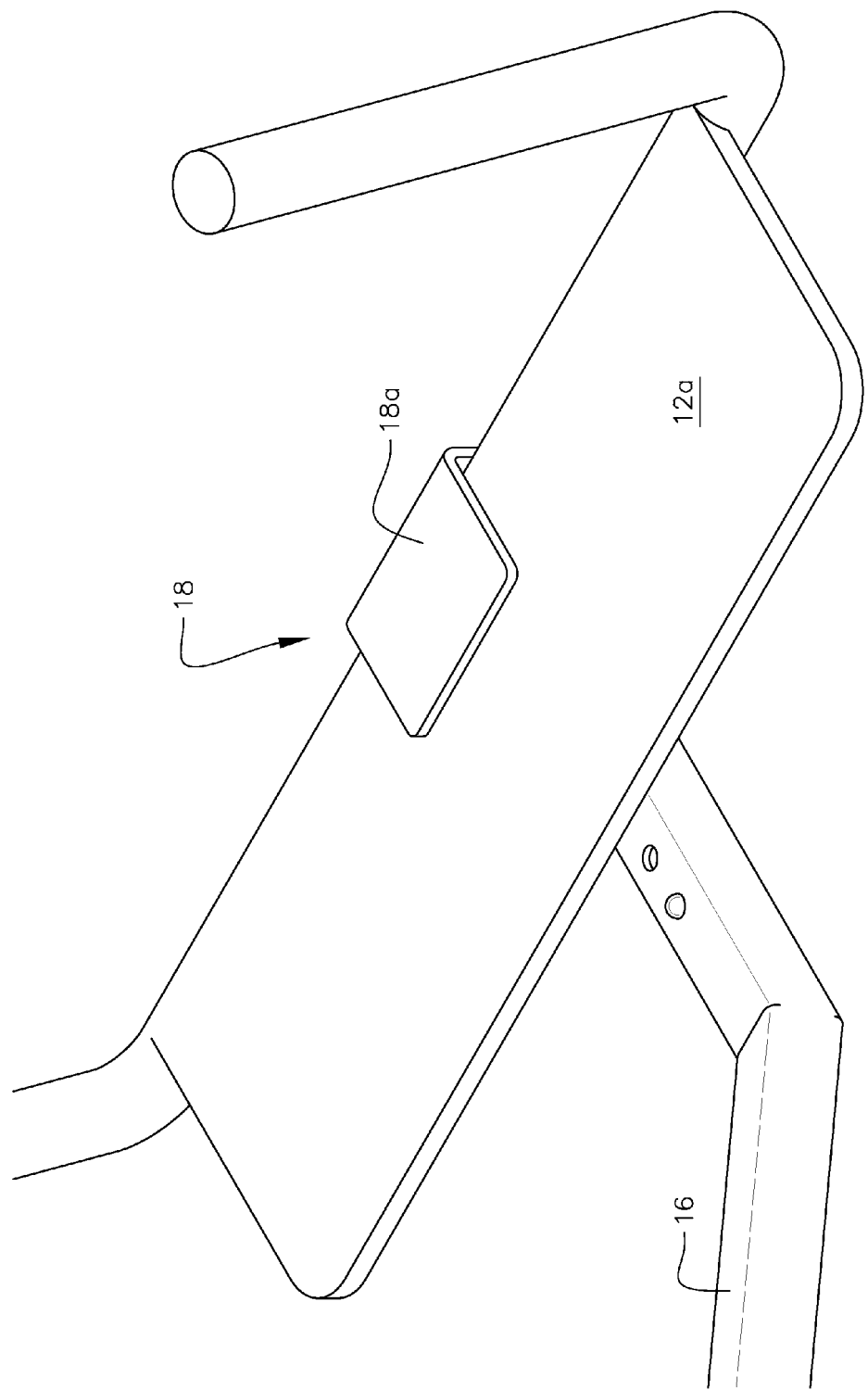
FIG. 5 is a representative depiction of the wheelchair rigid foot rest portion in the foot rest securement portion.
Figure 6:
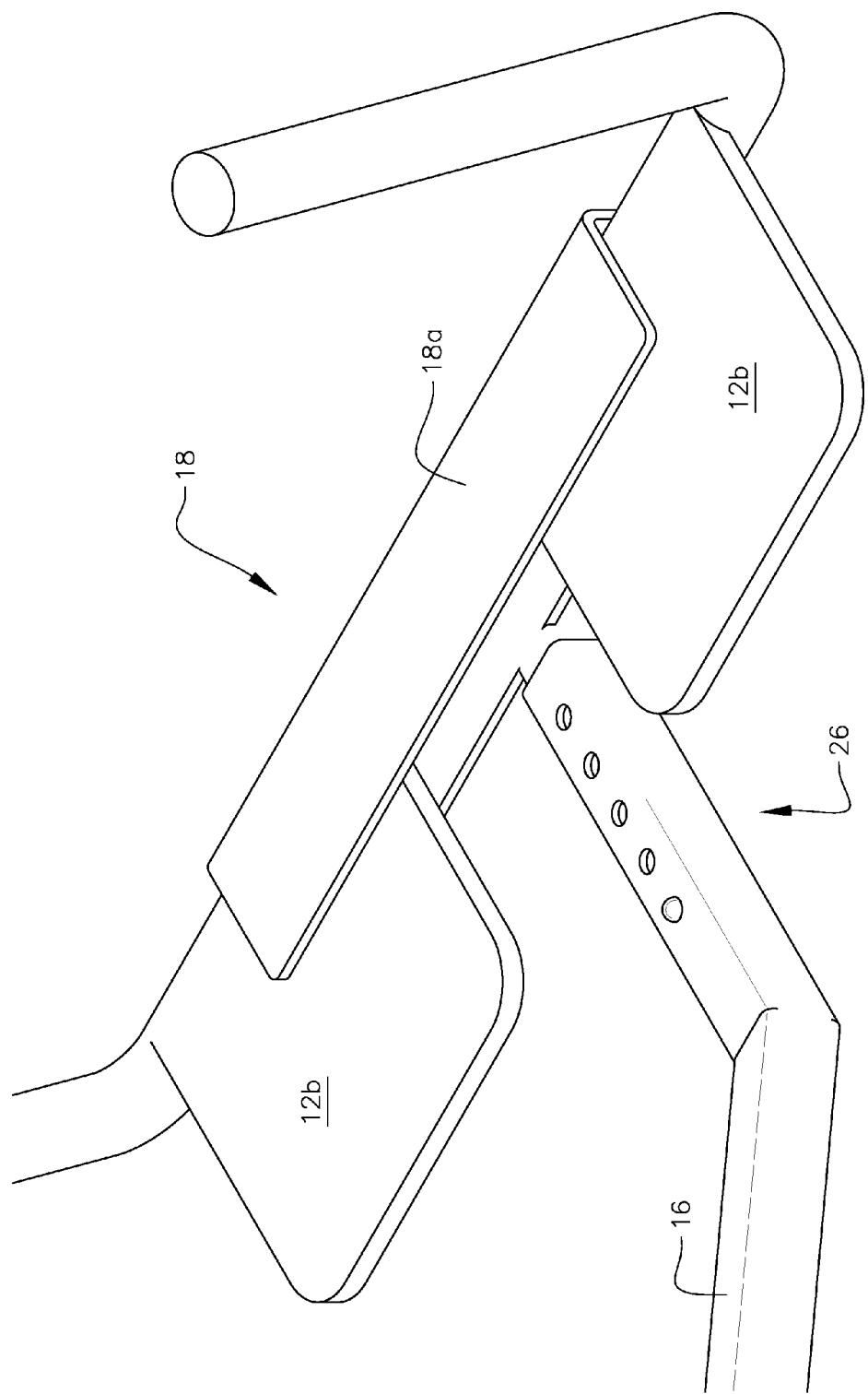
FIG. 6 is a representative depiction of the wheelchair split foot rest portion in the foot rest securement portion.
Figure 7:
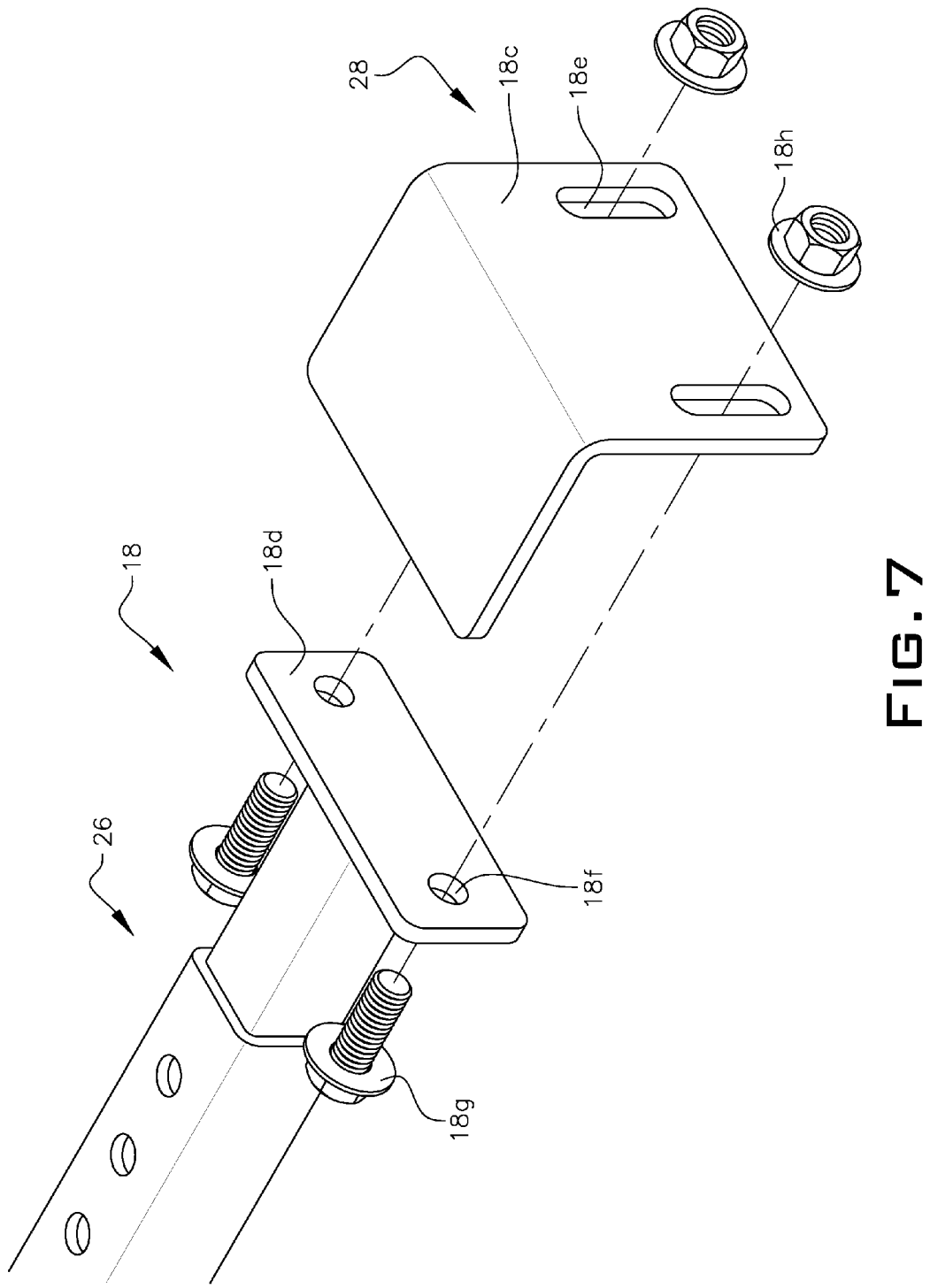
FIG. 7 is a representative depiction of the space adjustment feature of the foot rest securement portion.

The means 18 for receiving the portion of the foot rest (that is, a portion of a rigid foot rest 12a or portions of adjacent foot rests 12b,12b') is preferably configured as a generally L-shaped member 18a having a predetermined length 18b transversely oriented in relation to the first elongate structural member 16. The L-shaped member 18a is understood to also mean the equivalents of its configuration, that is, U-shaped or C-shaped. The length 18b can be a channel less than a few inches in length or it can be longer to accommodate the gap between separate foot rests 12b,12b' as well as enough in length to allow a sufficient portion of each foot rest 12b,12b' to be secured by the L-shaped channel or member 18a. In addition, an optional feature is to make the opening of the L-shaped member 18a adjustable in width to accommodate the combined thickness of a foot rest plate and any underlying structural member and/or any cushioning feature added to the member 18a such as a rubber sheet adhesively applied. There are several means by which to accomplish this feature or means 28 for adjusting a width of the means 18 for securing the foot rest. One example is to simply form the L-shaped member 18a using an angle bar stock form 18c overlapping a plate member 18d with slotted parallel holes 18e in the L-shaped form 18c and parallel apertures 18f in the plate 18d within which fasteners can be used (in the FIG. 7, bolts 18g and nuts 18h are representatively shown as one example of fastening components together). Of course, the L-shaped member 18a may have a uniform or universal non-adjustable opening width sufficient to accept most wheelchair foot rests. Plate 18d can be a flat plate as shown in FIG. 7 or an angle plate form as shown in FIG. 3 for use when a split wheelchair foot plate is used, which allows for the split portion to rest on the horizontal surface of the angle plate form.

The first elongate structural member 16 can have an upwardly directed bent portion 16c at an intermediate portion of the means 18 for receiving the portion of the foot rest (12a or combination of 12b,12b'). This will orient the lower portion of the first elongate structural member 16 so that it is nearly parallel to a road or ground surface 34 immediate under the motorcycle or recreational vehicle 14 and at the same time will facilitate maintaining the wheelchair 12 in a substantially normal level orientation when mounted to the motorcycle or recreational vehicle 14 as generally depicted in the FIG. 4.

To accommodate different overall heights in wheelchairs, the first elongate structural member 16 may include means 26 for adjusting a length of the member 16. There are several ways this could be done. By way of example only, member 16 is depicted in FIG. 1 as being in two parts 16d,16e, one part telescoping into the other. The locking into place can be done with spaced-apart apertures 16f and a snap button 16g similar to those used on umbrella poles and the like. Another equivalent method not shown in the drawings is the use of telescoping parts 16d,16e where the parts incorporate an internal friction twisting lock similar to those used in golf ball retrievers, pool cleaner poles, and the like. In the latter case, member 16 would incorporate circular cross-section tubes 16d,16e versus the square-shaped tubes depicted in the drawings.

The means 24 for receiving and securing the axle 12c comprises one or more formed channel members 30 configured and sized to receive the axle 12c resting into the one or more formed channel members 30. The formed channel members 30 are transversely oriented in relation to the second elongate structural member 20. As depicted in the drawings, the device 10 can be configured similar to a bike handle (U-shaped) with spaced-apart cups or channel member 30 aligned to each other so that the axle has a two point rest. It is understood that the channel member 30 can be one continuous piece as well, as readily understood from FIGS. 1-3.

The formed channel member(s) 30 is designed to have a predetermined length and is transversely oriented in relation to the second elongate structural member 20. Where the foot rest(s) is typically placed in the foot rest securing means 18 first, the wheelchair 12 is then lowered into the means 24 for receiving and securing the axle 12c. Accordingly, one can see that a configuration of a U-shaped, C-shaped, J-shaped or L-shaped channel 30 would work just as well, especially depending on the nature of the axle securement means incorporated in the device 10 and further described hereinafter.

As mentioned above, the axle receiving and securement means 24 can be done in a number or ways known in the art. One method not depicted is to make the receiving channel(s) 30 such that the axle 12c friction fits or snaps into place or where the channel 30 spring clamps the axle 12c in place. Another method is to use a lever operated link-cam type of lock that is commercially available from industrial equipment/parts catalogs such as Tooley Imports where the lock is attached adjacent to the axle receiving portion and a lever is pushed down to force an opposing lever to drop down on top of the axle to hold it in place. Another preferred alternative method is to use one or more straps 24a to hold the axle 12c in place where the straps 24a can be engaged with knobs 24b through apertures 24c in straps 24a.

The means 24 for receiving and securing the axle 12c preferably further comprises means 32 for cushioning the axle 12c when mounted in place. There are a number of shock absorbing and cushioning materials that can be used such as adhesively lining portions of the axle receiving means 24 with durable, flexible, relatively soft rubber and/or foam based materials.

The means 18 for receiving the foot rest (portion of a rigid foot rest 12a or portions of separated adjacent foot rests 12b,12b') may optionally further include means for cushioning the rigid foot rest 12a or portions of separated adjacent foot rests 12b,12b'. As mentioned above for the axle cushioning means 32, there are a number of shock absorbing and cushioning materials that can be used such as adhesively lining portions of the foot rest receiving/securing means 18 with durable, flexible, relatively soft rubber and/or foam based materials.

The bent portion 20a of the lower portion of the second elongate structural member 20 further comprises at least two apertures 20e therein for inserting fasteners to be fastened to the frame portion 22 of the motorcycle or recreational vehicle 14.

The device 10 must be secured to the frame of the motorcycle or recreational vehicle 14. One example of a frame attachment means 20c for attaching the device to the frame portion 22 of the motorcycle or recreational vehicle 14 is the use of a formed structural member 20a directed away from the first elongate structural member 16. The formed structural member 20a would typically incorporate at least two apertures 20e near its distal end 20b for inserting fasteners (not shown) to be fastened to the frame portion 22 of the motorcycle or recreational vehicle 14. There are several other possible ways of attaching the device 10 to the frame portion 22; however, it is preferable that fasteners be used to ensure adequate secure mounting.

The structural portions of the device 10 can be made from a variety of rigid and durable materials, preferably materials that will not corrode or materials that have been properly coated or plated to prevent corrosion, while providing the desired strength and durability characteristics of such a device 10. Examples, but not limited to, are steel, aluminum, stainless steel, titanium, and fiber reinforced composite polymer based materials, among other equivalent materials.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A transporting device for transporting a wheelchair directly on a motorcycle or recreational vehicle comprising:
    a first elongate structural member having a proximal end and a distal end;
    the distal end having means for receiving and securing a portion of a foot rest of a wheelchair;
    the proximal end of said first elongate structural member being attached to an intermediate location on a second elongate structural member;
    a lower portion of said second elongate structural member having a bent portion configured to facilitate attachment to a frame portion of said motorcycle or recreational vehicle;
    a distal portion of said bent portion of said second elongate structural member having frame attachment means for attaching said device to said frame portion of said motorcycle or recreational vehicle; and said second elongate structural member having a generally upward directed portion, an upper end of said generally upward directed portion having means for receiving and securing an axle of said wheelchair, wherein said first elongate structural member includes means for adjusting a length of said first elongate structural member.

2. The device according to claim 1, wherein said means for receiving said portion of said foot rest is a generally L-shaped member having a predetermined length transversely oriented in relation to said first elongate structural member.

3. The device according to claim 1, wherein said first elongate structural member has an upwardly directed bent portion at an intermediate portion of said means for receiving said portion of said foot rest.

4. The device according to claim 2, wherein said generally L-shaped member includes means for adjusting a width of an opening of said generally L-shaped member.

5. The device according to claim 1, wherein said means for receiving and securing said axle comprises one or more formed channel members configured and sized to receive said axle resting into said one or more formed channel members, said one or more formed channel members being transversely oriented in relation to said second elongate structural member.

6. The device according to claim 1, wherein said means for receiving and securing said axle comprises two aligned spaced-apart formed channel members configured and sized to receive said axle resting into said two aligned spaced-apart formed channel members, said two aligned spaced-apart formed channel members being transversely oriented in relation to said second elongate structural member.

7. The device according to claim 1, wherein means for receiving and securing said portion of said axle further comprises means for cushioning said axle.

8. The device according to claim 1, wherein said bent portion of said lower portion of said second elongate structural member further comprises having at least two apertures therein for inserting fasteners to be fastened to said frame portion of said motorcycle or recreational vehicle.

9. A transporting device for transporting a wheelchair directly on a motorcycle or recreational vehicle, the transporting device being configured as a wheelchair holding bracket comprising:

frame attachment means for attaching said bracket to a frame portion of a motorcycle or recreational vehicle;

means for receiving and securing a portion of a foot rest of a wheelchair, said means for receiving and securing said portion of said foot rest being spaced-apart from said frame attachment means; and means for receiving and securing an axle of said wheelchair, said means for receiving and securing said axle being spaced-apart and above said frame attachment means and said means for receiving and securing a portion of said foot rest, wherein said bracket includes means for adjusting a length of said bracket between said means for securing said axle and said means for receiving and securing said portion of said foot rest of said wheelchair, and wherein said means for receiving and securing said axle comprises one or more formed channel members configured and sized to receive said axle resting into said one or more formed channel members, said one or more formed channel members being transversely oriented in relation to said bracket.

\* \* \* \* \*